United States Patent
Chu et al.

(10) Patent No.: US 8,629,966 B2
(45) Date of Patent: Jan. 14, 2014

(54) DISPLAY PANEL AND SEALING STRUCTURE

(75) Inventors: Chih-Wei Chu, Hsinchu County (TW); Ming-Che Hsieh, Taipei (TW); Shih-Yu Wang, Changhau County (TW)

(73) Assignee: Au Optronics Corporation, Hsinchu (TW)

( * ) Notice: Subject to any disclaimer, the term of this patent is extended or adjusted under 35 U.S.C. 154(b) by 1069 days.

(21) Appl. No.: 12/634,696

(22) Filed: Dec. 10, 2009

(65) Prior Publication Data

US 2011/0069271 A1    Mar. 24, 2011

(30) Foreign Application Priority Data

Sep. 23, 2009 (TW) .............................. 98132116 A (51) Int. Cl.
*G02F 1/1339* (2006.01)
(52) U.S. Cl.
USPC .......................................................... 349/153
(58) Field of Classification Search
USPC .......................................................... 349/153
See application file for complete search history.

(56) References Cited

U.S. PATENT DOCUMENTS 6,633,361 B1    10/2003  Fujita
6,831,725 B2 *  12/2004  Niiya ............................ 349/153

FOREIGN PATENT DOCUMENTS

| JP | 2003-014655 | 1/2003 |
| TW | 200508725 | 3/2005 |
| TW | 200708821 | 3/2007 |

OTHER PUBLICATIONS

"Office Action of Taiwan Counterpart Application", issued on Dec. 24, 2012, p. 1-p. 7, in which the listed references were cited.

* cited by examiner

Primary Examiner — James Dudek
(74) Attorney, Agent, or Firm — Jianq Chyun IP Office (57) ABSTRACT

An LCD panel includes a first substrate, a second substrate, a displaying medium and a sealing structure, wherein the second substrate is located at the side opposite to the first substrate and the displaying medium is located between the first substrate and the second substrate for displaying an image. The sealing structure is located between the first substrate and the second substrate to seal the displaying medium, wherein the sealing structure includes an inner wall, an outer wall and a sealant. The inner wall disposed surrounding the displaying medium and the outer wall disposed surrounding the inner wall together form a sealant-disposing space therebetween. The outer wall has a plurality of side wall holes and the sealant is disposed in the sealant-disposing space. In this way, the sealing structure is able to enhance the structure strength in a limited layout space and promote the process margin.

22 Claims, 8 Drawing Sheets

DISPLAY PANEL AND SEALING STRUCTURE

CROSS-REFERENCE TO RELATED APPLICATION

This application claims the priority benefit of Taiwan application serial no. 98132116, filed Sep. 23, 2009. The entirety of the above-mentioned patent application is hereby incorporated by reference herein and made a part of specification.

BACKGROUND OF THE INVENTION

1. Field of the Invention

The present invention generally relates to a liquid crystal display panel (LCD panel) and a sealing structure, and more particularly, to an LCD panel and a sealing structure with a plurality of side wall holes.

2. Description of Related Art

The rapid development in the multimedia society today is largely attributed to the astonished progress in semiconductor devices and display apparatuses. Among various display panels, due to advantages of high display quality, high space utilization, low power consumption and no radiation with an LCD panel, the LCD panel has played a major role in the mainstream display market.

Usually, an LCD panel comprises a thin film transistor array substrate (TFT array substrate), a liquid crystal layer and a color filter substrate, wherein the TFT array substrate fitly attaches and adheres to the color filter substrate through the adhesiveness of a sealant located in a frame, and the liquid crystal layer is sealed between the TFT array substrate and the color filter substrate through the above-mentioned sealant. The sealant herein is mainly used to make the liquid crystals injected in the process stably sealed between the TFT array substrate and the color filter substrate. Besides, the sealant can also contribute somewhat to keep the cell gaps of the liquid crystals unchanged.

Along with the great expectation of consumers on various requirements of an LCD panel, such as light-slim-short-small shape design, high resolution and high quality, the width of the frame in a limited layout space tends to be smaller and smaller, and the width of the sealant is accordingly reduced. However, a downsized sealant width may encounter the problems of insufficient structure strength and inadequate adhesive intensity, which results in poor reliability of the LCD panel. Moreover in a worse situation, the TFT array substrate and the color filter substrate are easily separated from each other due to the insufficient mechanical strength or inadequate adhesive intensity of the sealant. On the other hand, with a reduced width of the sealant, it becomes a significant issue to precisely define injecting the sealant in a limited design width, which has a great impact on the capacity and the stability of the process machine on the production line and the sealant-injecting process.

SUMMARY OF THE INVENTION

Accordingly, the present invention is directed to an LCD panel with a reduced width of the frame thereof and a sealing structure having high mechanical strength.

The present invention is also directed to a sealing structure able to keep a quite high mechanical strength in a limited layout space and increase the process margin of the sealant.

The present invention provides an LCD panel, which includes a first substrate, a second substrate, a displaying medium and a sealing structure. The second substrate is located at the side opposite to the first substrate. The displaying medium is located between the first substrate and the second substrate for displaying an image. The sealing structure is located between the first substrate and the second substrate to make the displaying medium sealed between the first substrate and the second substrate, wherein the sealing structure includes an inner wall, an outer wall and a sealant. The inner wall is disposed surrounding the displaying medium, the outer wall is disposed surrounding and outside the inner wall, and the inner wall and the outer wall together form a sealant-disposing space therebetween. The outer wall has a plurality of side wall holes and the sealant is disposed in the sealant-disposing space.

The present invention provides a sealing structure, configured to seal a displaying medium of an LCD panel between a first substrate and a second substrate. The sealing structure includes an inner wall, an outer wall and a sealant. The inner wall is disposed surrounding the displaying medium, the outer wall is disposed surrounding and outside the inner wall, and the inner wall and the outer wall together form a sealant-disposing space therebetween. The outer wall has a plurality of side wall holes and the sealant fills into the sealant-disposing space.

In an embodiment of the present invention, the above-mentioned sealant is further disposed in at least a part of the side wall holes.

In an embodiment of the present invention, the above-mentioned side wall holes are disposed along the width direction of the outer wall and separately arranged on a plane with the same height of the outer wall, wherein an internal sidewall of each side wall hole is, for example, respectively adjacent to the first substrate and the height of every side wall hole is substantially a half height of the outer wall.

In an embodiment of the present invention, the above-mentioned side wall holes are arranged on a plane with a half height of the outer wall, wherein the height of every side wall hole is, for example, substantially a quarter height of the outer wall.

In an embodiment of the present invention, the above-mentioned first substrate has a first common electrode and the second substrate has a second common electrode, wherein the second common electrode extends onto the surface of the inner wall and the first common electrode and the second common electrode are electrically connected to each other via the inner wall. In addition, the surface of the inner wall has a deformation-buffering pattern thereon, and the first common electrode and the second common electrode are connected to each other through the deformation-buffering pattern of the inner wall.

In an embodiment of the present invention, the above-mentioned LCD panel can further include a plurality of conductive spacers located between the first substrate and the second substrate, wherein a first common electrode on the first substrate and a second common electrode on the second substrate are electrically connected to each other via the conductive spacers. The conductive spacers are located in the displaying medium or in the sealant-disposing space.

In an embodiment of the present invention, the above-mentioned sealing structure can further include an electrode layer cladding the surface of the inner wall.

Based on the description above, the present invention employs a sealing structure with an inner wall and an outer wall wherein the outer wall contains a plurality of side wall holes. The sealant-disposing space of the sealing structure is filled with the sealant, and the partial sealant can further be distributed in the side wall holes on the outer wall, so that the adhesiveness between the sealant and the first substrate and second substrate is increased, and the downsized width of the sealant is assured not to weaken the structure strength. In addition, the sealing structure of the present invention can also enhance the process capacity and stability of the sealant process.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The present invention mainly provides a sealing structure to seal a sealant between an inner wall and an outer wall, wherein the inner wall and the outer wall are respectively located at both sides of the sealant used to enhance the integral structure strength, so that the LCD panel with a reduced edge width of the frame thereof still performs a certain required structure strength within a limited width. In addition, during conducting a sealant process, the predetermined structure on the outer wall provides a buffered disposing space to the sealant, so that the conducted sealant process wins a larger process margin. By using the partial sealant located in the predetermined structure of the outer wall, the integral structure strength of the sealing structure and the adhesive intensity between the sealing structure and the upper and lower substrates are further enhanced. Reference will now be made in detail to the sealing structure and the LCD panel employing the sealing structure provided by the present invention, wherein the given examples are illustrated in the accompanying drawings. Wherever possible, the same reference numbers are used in the drawings and the description to refer to the same or like parts.

Figure 1A:
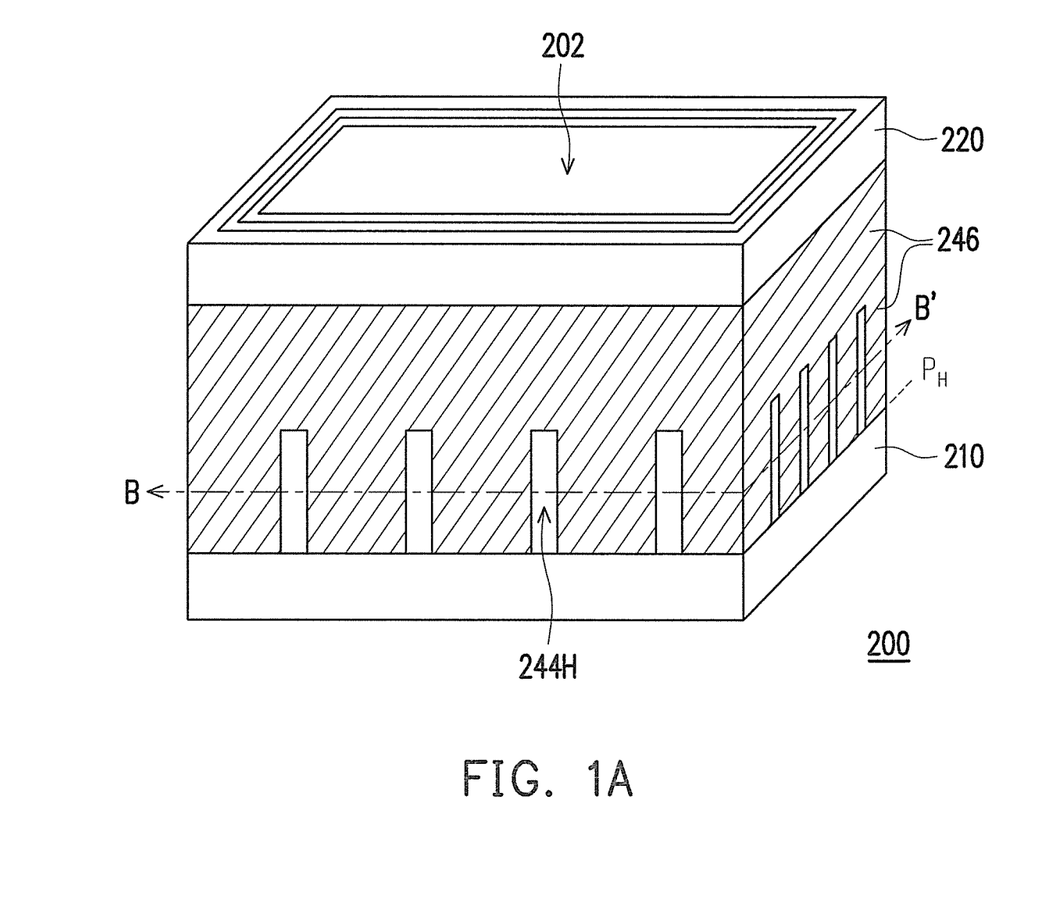
FIGS. 1A and 1B are a 3-dimensional diagram and a cross-sectional diagram of an LCD panel according to an embodiment of the present invention.
Figure 1B:
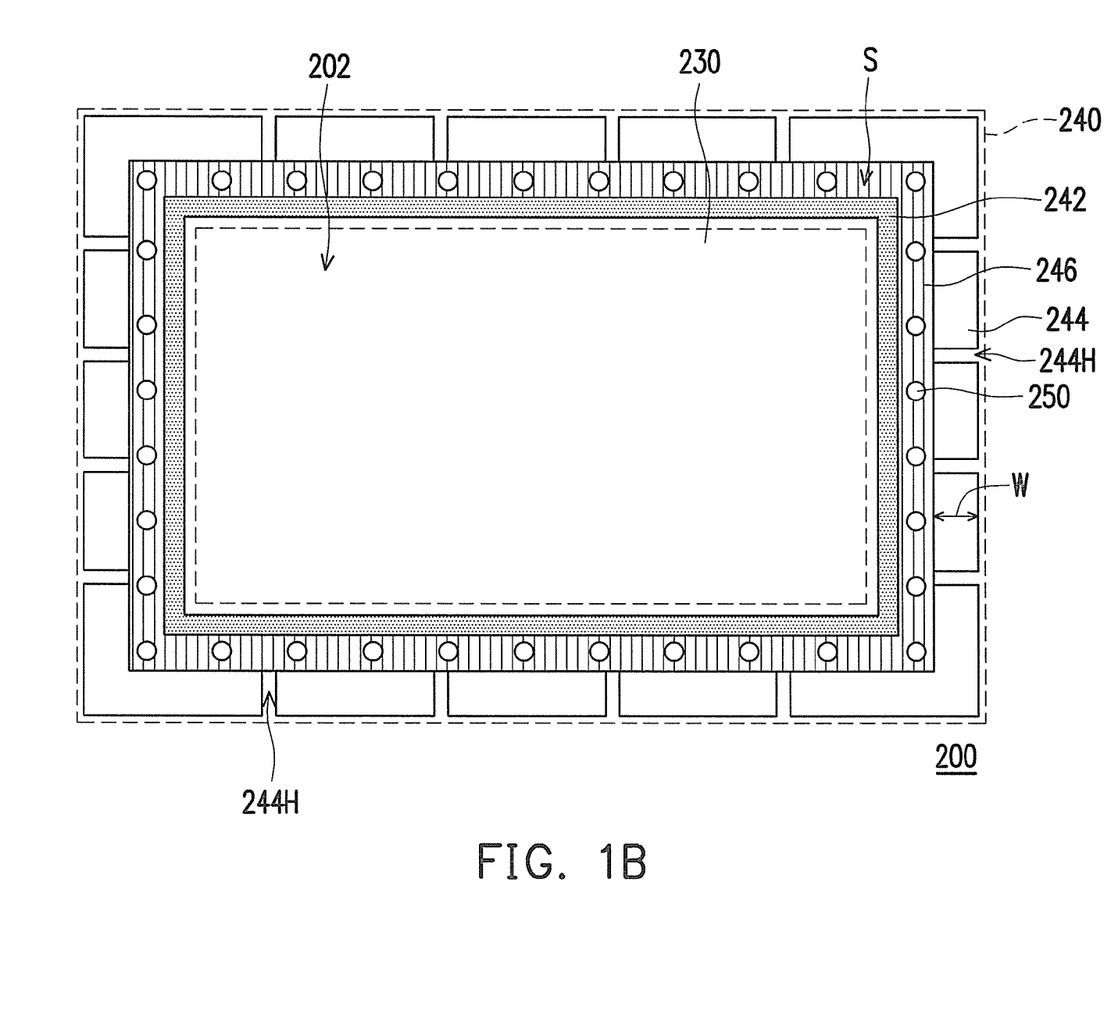

FIGS. 1A and 1B are a 3-dimensional diagram and a cross-sectional diagram of an LCD panel according to an embodiment of the present invention, wherein FIG. 1B is the one sectioned along B-B' line. Referring to FIGS. 1A and 1B, an LCD panel 200 includes a first substrate 210, a second substrate 220, a displaying medium 230 and a sealing structure 240. The second substrate 220 is located at the side opposite to the first substrate 210, the displaying medium 230 is located between the first substrate 210 and the second substrate 220, and the sealing structure 240 seals the displaying medium 230 between the first substrate 210 and the second substrate 220. In more details, the sealing structure 240 includes an inner wall 242, an outer wall 244 and a sealant 246, wherein the inner wall 242 is disposed surrounding the displaying medium 230, the outer wall 244 is disposed outside and surrounding the inner wall 242, the inner wall 242 and the outer wall 244 together form a sealant-disposing space S between the inner wall 242 and the outer wall 244, the outer wall 244 contains a plurality of side wall holes 244H, and the sealant 246 is disposed in the sealant-disposing space S.

Moreover, the first substrate 210 and the second substrate 220 can be respectively a TFT array substrate and a color filter substrate. The displaying medium 230 is mainly for displaying an image. For example, the displaying medium 230 comprises mainly, for example, a liquid crystal layer, a pixel array and a common electrode (not shown). The displaying medium 230 is distributed in the displaying region 202 of the LCD panel 200. The liquid crystal molecules in the liquid crystal layer tilt in different extents depending on the voltage differences between the pixel array and the common electrode, so that the LCD panel 200 exhibits different gray-levels within the displaying region 202 for displaying an image. The displaying medium 230 for displaying an image is sealed between the first substrate and the second substrate by a sealing structure. The displaying medium 230 also can be such as an organic light emitting layer, an electrophoretic display layer or other display materials not limited herein.

In more details, in the sealing structure 240 of the present invention, the sealant 246 is supported by the inner wall 242 and the outer wall 244 so as to be adhered between the first substrate 210 and the second substrate 220, which is advantageous in increasing the integral structure strength of the sealing structure 240. In other words, the sealing structure 240 of the present invention is able to achieve a certain required structure strength within a limited width, and the integral width of the frame of the LCD panel 200 where the sealing structure 240 is employed can be effectively reduced, which benefits to increase the layout space of the displaying region 202 and further increase the aperture ratio and displaying quality of the LCD panel 200. The width range of the inner wall 242 can be substantially between 10 μm to 50 μm, the width range of the outer wall 244 can be substantially between 100 μm to 400 μm and the range of the sealant-disposing space S can be substantially between 100 μm and 1000 μm. In the embodiment, the width of the inner wall 242 can be substantially 15 μm, the width of the outer wall 244 can be substantially between 200 μm and the width of the sealant-disposing space S can be substantially between 700 μm.

It should be noted that in terms of the design features of the sealing structure of the present invention, in addition to employing an inner wall and an outer wall to support the sealant from the both sides thereof, a plurality of side wall holes 244H are further disposed on the outer wall 244, wherein the side wall holes 244H go through the outer wall 244 and then communicate with the sealant-disposing space S. In more details, the outer wall 244 is a continuous ring-shape wall and the side wall holes 244H are formed by getting hollow on the ring-shape wall along the width direction thereof. In the practical process, when the volume amount of the sealant 246 is substantially greater than the capacity of the sealant-disposing space S, the excessive amount of the sealant 246 flows along the side-wall of the outer wall 244 and then flows into the side wall holes 244H of the outer wall 244. In this way, the sealant 246 after curing would be distributed in the sealant-disposing space S and at least a part of the side wall holes 244H, which increases the contact area between the sealant 246 and the outer wall 244 and accordingly enhances the adhesive intensity of the sealant 246 to the outer wall 244. On the other hand, the side wall holes 244H of the outer wall 244 provide the sealant 246 with a buffer disposing space so that a certain supplying amount discrepancy of the sealant 246 is permitted, which further promotes the capacity and stability of the process. In addition, the side wall holes 244H also serve as the sealant overflowing port for the sealant 246 in the process so as to avoid that the sealant 246, due to the excessive amount and nowhere discharged situation, produces a side pressing force applying onto the inner wall 242 and the outer wall 244 at the both sides thereof to make the sealing structure 240 avalanche.

In order to further enhance the strength of the sealing structure, a plurality of auxiliary photo spacers 250 can be disposed in the sealant-disposing space in the embodiment, as shown in FIG. 1B, wherein the adhesive intensity and the supporting strength between the first substrate 210 and the second substrate 220 are enhanced by the auxiliary photo spacers 250.

Continuing to FIGS. 1A and 1B, in the embodiment, the inner wall 242 and the outer wall 244 are made of the same material and fabricated with a same photomask process. The side wall holes 244H can be separated from each other and arranged on a plane $P_H$ with the same height of the outer wall 244 and disposed along the width direction W of the outer wall 244 so that the side wall holes 244H can be fabricated by using a simpler process.

Figure 2A:
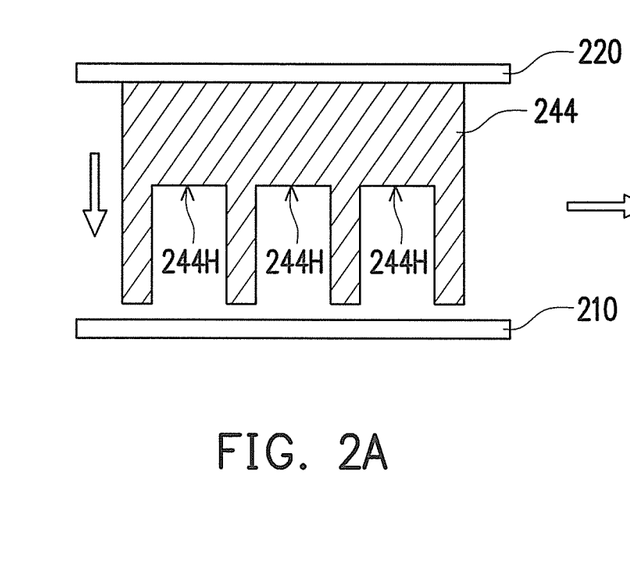
FIGS. 2A and 2B are flow charts of fabricating an LCD panel according to an embodiment of the present invention.
Figure 2B:
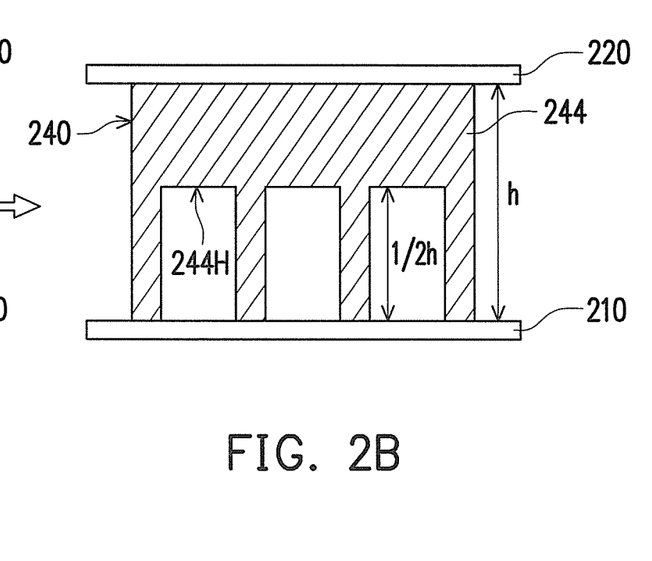

The fabricating method of an outer wall having side wall holes in an LCD panel, for example, the LCD panel 200 of FIG. 1A, is depicted as follows. Referring to FIGS. 2A and 2B, herein only the structures and the dimensions of the first substrate, the second substrate and the outer wall are schematically shown for clearly explaining the fabricating method of the outer wall and the side wall holes, while the other parts are omitted.

Referring to FIG. 2A, the outer wall 244 is directly formed on the second substrate 220. To form the outer wall 244, first, for example, a photoresist spacer material layer (not shown) is formed on the second substrate 220. Next, the photoresist spacer material layer (not shown) is exposed by using a halftone photomask. Since the halftone photomask has regions with different optical transmittances, a predetermined forming region of the side wall holes 244H and the other regions on the photoresist spacer material layer are exposed in different extents. After a developing process, the outer wall 244 with the side wall holes 244H is then formed on the second substrate 220. In the embodiment, the first substrate 210 and the second substrate 220 are respectively, for example, a TFT array substrate and a color filter substrate.

As shown by FIG. 2A, the second substrate 220 uses a side of the outer wall 244 with the side wall holes 244H to fitly touch and adhere to the first substrate 210; the structure of the outer wall 244 after adhering is shown by FIG. 2B where an internal sidewall of each of the side wall holes 244H is together adjacent to the first substrate 210. In other words, the surface, adjacent to the outer wall 244, of first substrate 210 constitutes the internal sidewalls of each of the side wall holes 244H. In the embodiment, the height of every side wall hole 244H is substantially a half of the height h of the outer wall 244 or others, for example, three quarters even a quarter of the height h. Under the above-mentioned height design, a relatively better supporting strength of the structure can be obtained. The height of every side wall hole 244H can be equal to the height h of the outer wall 244 as well. In this regard, the outer wall 244 with the side wall holes 244H can be fabricated through a process compatible with the conventional process, and the simpler process can also achieve the goals of the enhanced strength of the sealing structure 240, the reduced edge width of the frame, the increased aperture ratio and the advanced displaying quality. The first substrate 210 and the second substrate 220 in the embodiment can respectively be a color filter substrate and a TFT array substrate as well, which the present invention is not limited to.

Figure 3A:
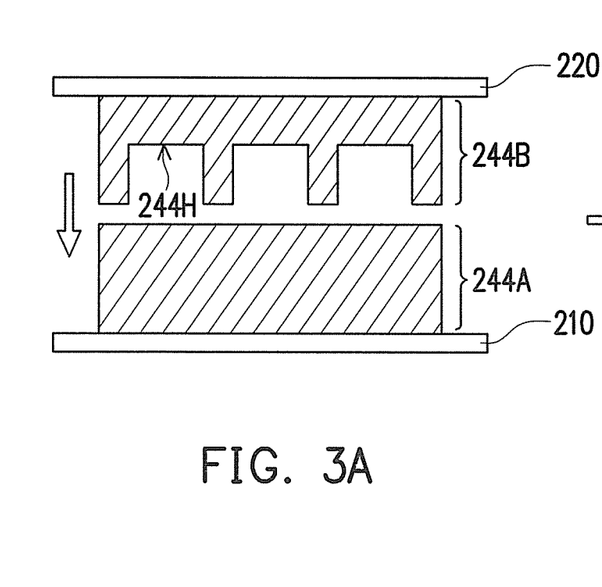
FIGS. 3A and 3B are flow charts of fabricating an LCD panel according to another embodiment of the present invention.
Figure 3B:
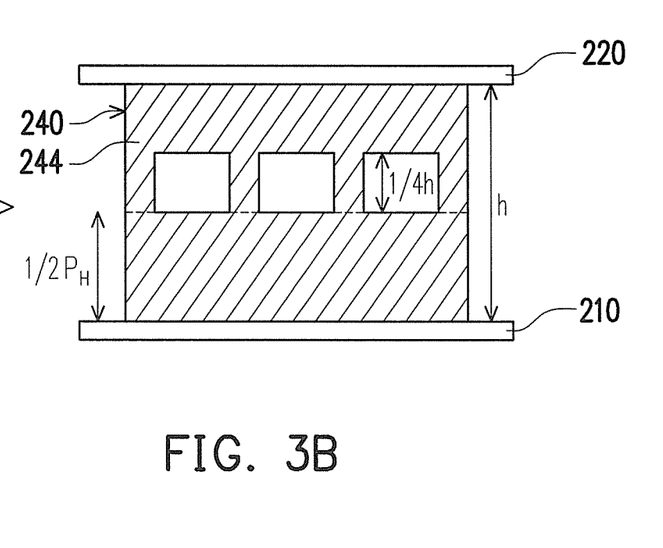

In the present invention, the structure of the side wall holes in the outer wall is not limited to that all the side wall holes are located on a plane adjacent to the first substrate, as depicted in follows. FIGS. 3A and 3B are flow charts of fabricating an LCD panel according to another embodiment of the present invention, where the structure of the side wall holes in the outer wall has a different layout and a different forming method.

Referring to FIG. 3A, first, the first portion 244A of the outer wall 244 is formed on the first substrate 210 by, for example, directly forming a photoresist spacer material layer (not shown) on the first substrate 210. Next, a photomask is used to conduct an exposing process and a developing process so as to form the first portion 244A of the outer wall 244. The second portion 244B of the outer wall 244 is also directly formed on the second substrate 220, as shown in FIG. 3A, wherein the second portion 244B of the outer wall 244 can be formed by using the above-mentioned method: first, a photoresist spacer material layer is formed on the second substrate 220; next, a halftone photomask is used to conduct an exposing process on the photoresist spacer material layer so as to form the second portion 244B of the outer wall 244 with the side wall holes 244H on the second substrate 220.

Then as shown in FIG. 3A, the second portion 244B of the outer wall 244 on the second substrate 220 fitly touches and adheres onto the first portion 244A of the outer wall 244 on the first substrate 210. After adhering, the structure of the outer wall 244 is shown by FIG. 3B, where the side wall holes 244H are located on a plane connecting both the first portion 244A and the second portion 244B, so that the side wall holes 244H are, for example, roughly arranged on a plane $P_H$ of the outer wall 244 with a half height thereof. In addition, in the embodiment, the height of the side wall holes 244H is substantially, for example, a quarter of the height h of the outer wall 244, so that the outer wall 244 with the side wall holes 244H can be fabricated through a process compatible with the conventional process, and the simpler process can also achieve the goals of the enhanced strength of the sealing structure 240, the reduced edge width of the frame, the increased aperture ratio and the advanced displaying quality.

Certainly, the height of the side wall holes 244H can be substantially less than a half height of the outer wall 244 or less than a quarter height of the side wall holes 244H as well. In fact, the present invention does not limit the dimension of the side wall holes 244H, and the designer can define the dimension and the distribution density of the side wall holes according to the viscosity of the sealant, the width of the outer wall and the size of the panel.

Figure 4:
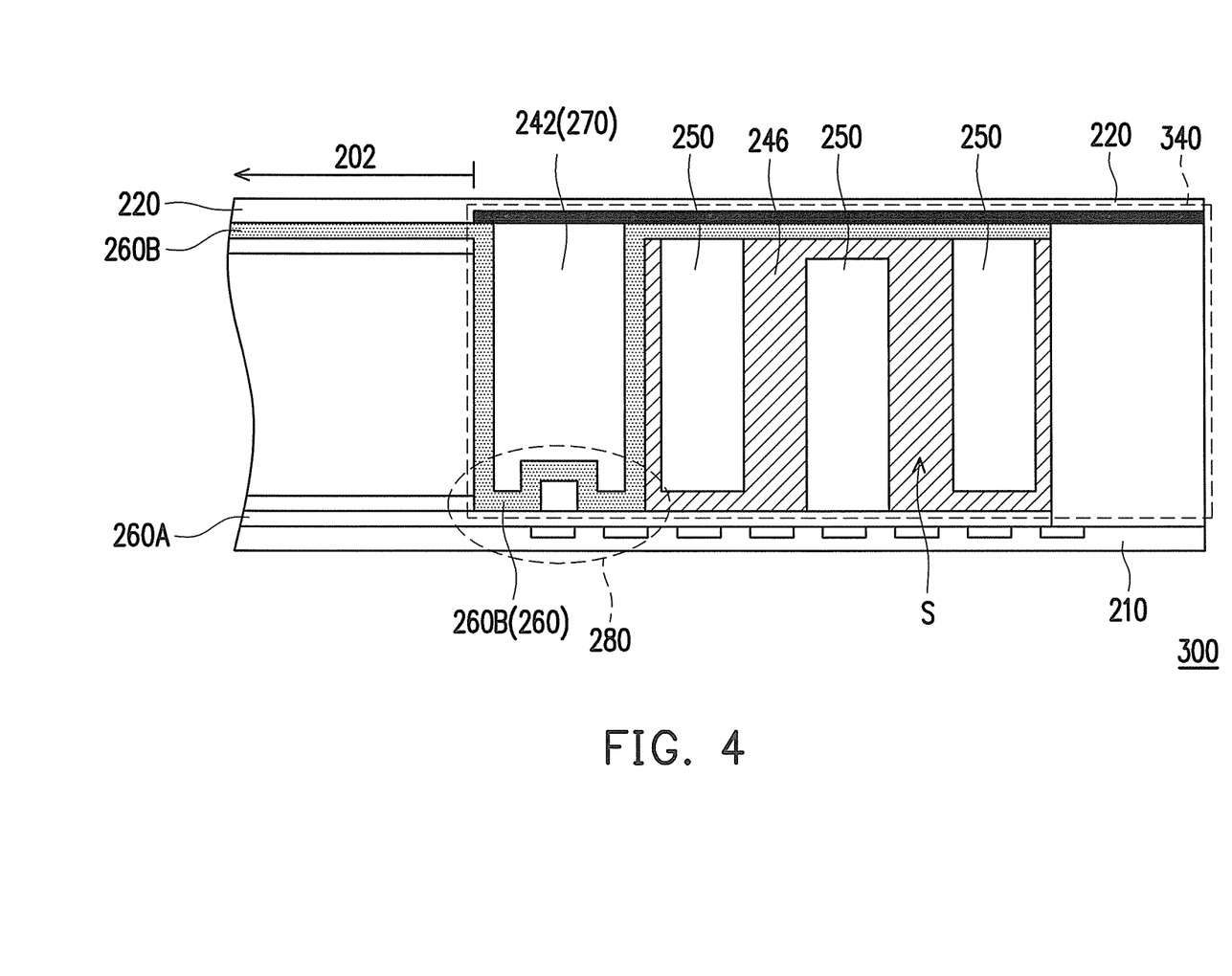
FIG. 4 is a cross-sectional diagram along the thickness direction of an LCD panel in an embodiment of the present invention.

FIG. 4 is a cross-sectional diagram along the thickness direction of an LCD panel in an embodiment of the present invention. Referring to FIG. 4, in the LCD panel 300 of the embodiment, the sealing structure 340 further includes an electrode layer 260 cladding the surface of the inner wall 242. In more details, the first substrate 210 has a first common electrode 260A and the second substrate 220 has a second common electrode 260B, wherein the first common electrode 260A is, for example, electrically connected to a pixel array on the first substrate 210 and the second common electrode 260B is, for example, an opposite electrode disposed opposite to the pixel array. Continuing to FIG. 4, the second common electrode 260B outwards extends from the displaying region 202 onto the surface of the inner wall 242 and overlays the surface of the inner wall 242 located at the periphery region. The first common electrode 260A also outwards extends from the displaying region 202 into the range of disposing the inner wall 242 and the sealant 246, so that when the first substrate 210 and the second substrate 220 are adhered onto each other, the first common electrode 260A is electrically connected to the second common electrode 260B via the inner wall 242 and further the first substrate 210 is electrically connected to the second substrate 220. In other words, in the embodiment, the inner wall 242 in the sealing structure 340 can directly serve as the conductive spacers 270 to make the two common electrodes of the supper substrate and the lower substrate (i.e. the first substrate 210 and the second substrate 220) electrically connected to each other (i.e., the first common electrode 260A and the second common electrode 260B are electrically connected to each other).

Referring to FIG. 4, in the embodiment, on the surface where the inner wall 242 connects the first substrate 210, a deformation-buffering pattern 280 is disposed, and the first common electrode 260A is connected to the second common electrode 260B through the deformation-buffering pattern 280 of the inner wall 242. When an external force is applied onto the inner wall 242, the applied mechanical energy of the force is absorbed by the deformation-buffering pattern 280. In addition, a plurality of auxiliary photo spacers 250 interlaced with each other can be disposed in the sealant-disposing space S of the embodiment, wherein the auxiliary photo spacers 250 interlaced with each other are respectively and interlaced with each other disposed on the first substrate 210 and the second substrate 220, and the adhesive intensity between the sealing structure 340 and the first substrate 210 and second substrate 220 is increased by increasing the contact area between the sealant 246 and the auxiliary photo spacers 250. It should be noted that the height of the auxiliary photo spacers 250 can be less than the height of the inner wall 242 or the height of the outer wall 244 by a little bit, which can increase the supporting strength between the first substrate 210 and the second substrate 220.

When the inner wall in the sealing structure directly serves as the conductive spacers, the present invention does not specifically limit the disposing positions and the range thereof. Two embodiments accompanied by FIGS. 5A and 5B are depicted in the following for explaining different disposing schemes of the conductive spacers 270.

Figure 5A:
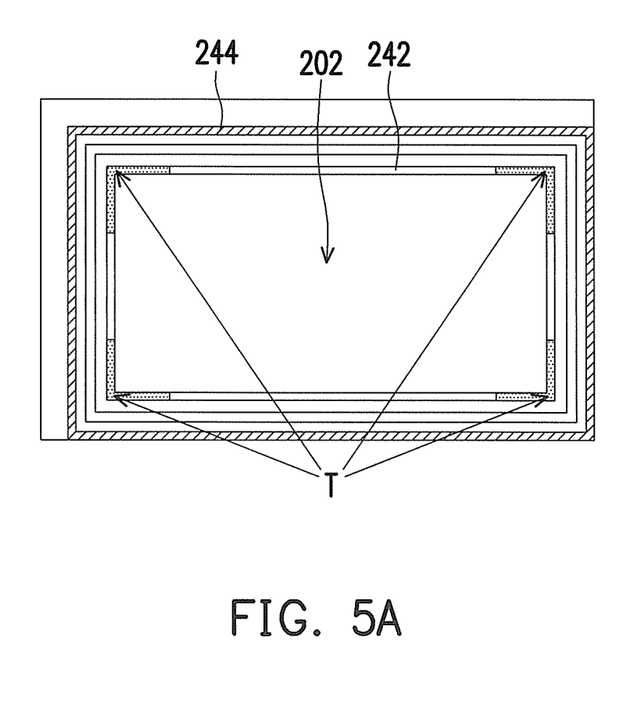
FIGS. 5A and 5B are two top-view diagrams of an LCD panel in an embodiment of the present invention.
Figure 5B:
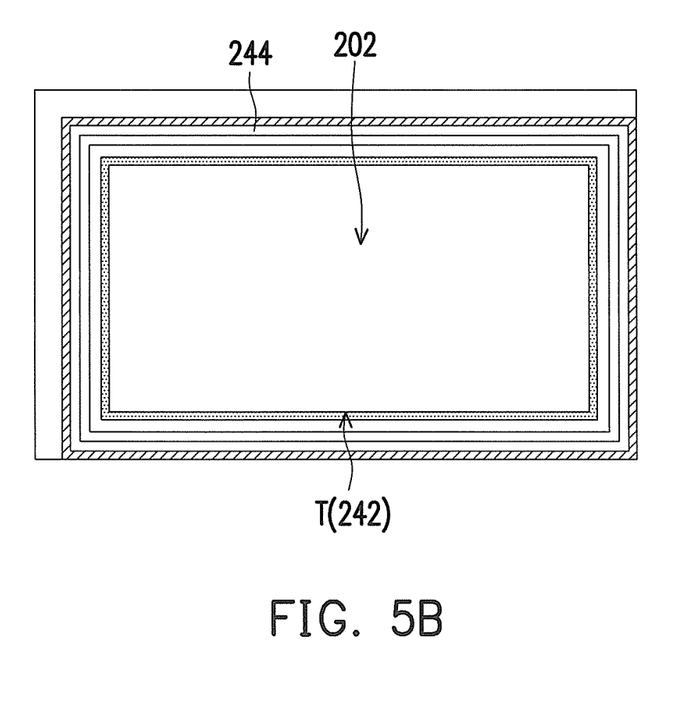

FIGS. 5A and 5B are two top-view diagrams of an LCD panel in an embodiment of the present invention. Referring to FIG. 5A, when the inner wall 242 in the sealing structure 340 directly serves as the conductive spacers 270, a region on the inner wall 242 for conducting the first common electrode 260A and the second common electrode 260B is roughly distributed at the four corners of the inner wall 242. A conductive region T of the inner wall 242 is notated in FIG. 5A; however, the region on the inner wall 242 for conducting the first common electrode 260A and the second common electrode 260B can be distributed within the full range of the inner wall 242 as well. As shown in FIG. 5B, the conductive region notated by T of the inner wall 242 is overlapped with the forming region of the inner wall 242, that is to say that the inner wall 242 has both a supporting function and an electricity conducting function. When the inner wall 242 in the sealing structure 340 directly serves as the conductive spacers 270, the present invention does not specifically limit the disposing positions and the range of the region on the inner wall 242 for conducting the first common electrode 260A and the second common electrode 260B.

Figure 6:
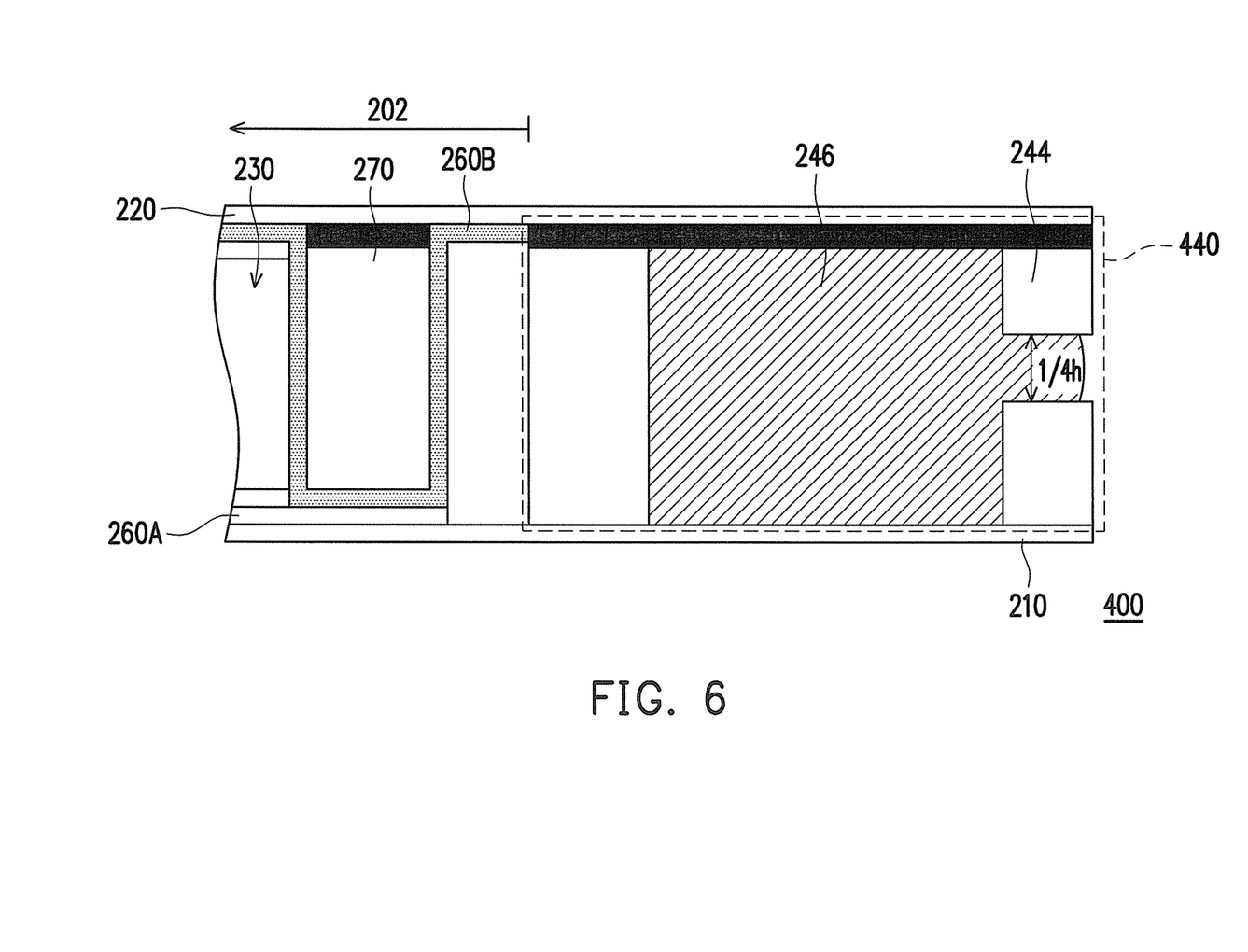
FIG. 6 is a cross-sectional diagram along the thickness direction of another LCD panel in an embodiment of the present invention.

FIG. 6 is a cross-sectional diagram along the thickness direction of another LCD panel in an embodiment of the present invention. Referring to FIG. 6, the embodiment further disposes conductive spacers 270 different from the sealing structure 440 on the LCD panel 400. In more details, the LCD panel 400 further includes a plurality of conductive spacers 270, which are located in the displaying medium 230 between the first substrate 210 and the second substrate 220. As shown in FIG. 6, the conductive spacers 270 are located on the second substrate 220, within the displaying region 202 and beside the sealing structure 440. When the first substrate 210 and the second substrate 220 are adhered onto each other, the first common electrode 260A is electrically connected to the second common electrode 260B via the conductive spacers 270 and further the first substrate 210 is electrically connected to the second substrate 220.

Figure 7:
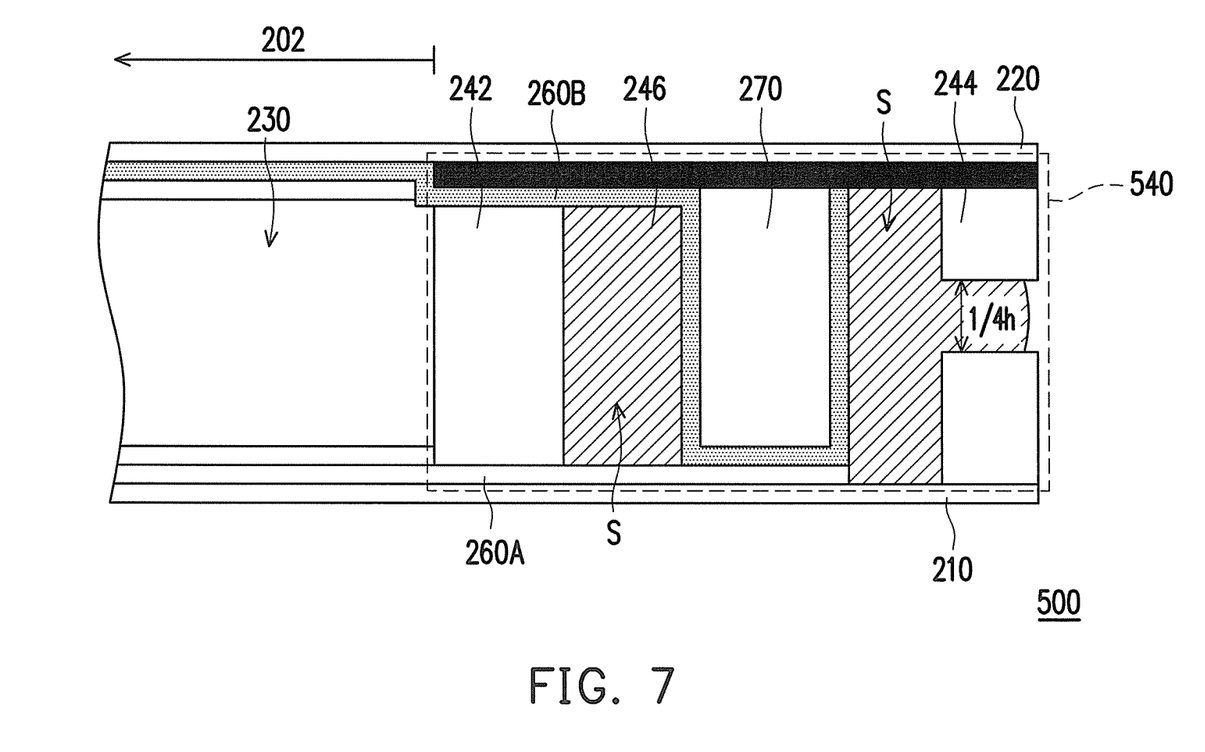
FIG. 7 is a top-view diagram of an LCD panel in an embodiment of the present invention.

FIG. 7 is a top-view diagram of an LCD panel in an embodiment of the present invention. Referring to FIG. 7, the conductive spacers 270 of the LCD panel 500 in the embodiment are located in the sealant-disposing space S. The second common electrode 260B outwards extends from the displaying region 202 into the sealant-disposing space S, as shown in FIG. 7. The inner wall 242 is located on the second common electrode 260B. The first common electrode 260A outwards extends from the displaying region 202 into the sealant-disposing space S as well, so that when the first substrate 210 and the second substrate 220 are adhered onto each other, the first common electrode 260A is electrically connected to the second common electrode 260B via the conductive spacers 270 in the sealant-disposing space S and further the first substrate 210 is electrically connected to the second substrate 220.A.

In summary, the LCD panel and the sealing structure of the present invention have at least following advantages.

In the sealing structure of the present invention, the inner wall and the outer wall together limit the sealant between the inner wall and the outer wall, so that the integral structure strength of the sealing structure is enhanced through the supporting strength of the inner wall and the outer wall, which moreover enhances the adhesive intensity between the sealant and the first substrate and second substrate, and the downsized width of the sealant is assured not to weaken the structure strength.

During the fabricating process of the sealant, the excessive sealant spread between the inner wall and the outer wall can overflow into the side wall holes of the outer wall, which can tolerate a certain errors of the process and promote the capacity and the stability of the process. On the other hand, after the curing, the contact area between the sealant and the outer wall is increased, which further promotes the adhesive intensity between the sealant and the outer wall and the integral structure strength of the sealing structure.

The fabrication method of the inner wall and the outer wall provided by the present invention can be integrated into the process of the color filter substrate or the TFT array substrate so as to save the production cost.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention.

What is claimed is:
1. A liquid crystal display panel, comprising:
a first substrate;
a second substrate, located opposite to the first substrate;
a displaying medium, located between the first substrate and the second substrate for displaying an image; and a sealing structure, located between the first substrate and the second substrate, wherein the sealing structure seals the displaying medium between the first substrate and the second substrate and the sealing structure comprises:
   an inner wall, surrounding the displaying medium;
   an outer wall, surrounding and outside the inner wall so as to form a sealant-disposing space between the inner wall and the outer wall, wherein the outer wall has a plurality of side wall holes, each of the side wall holes being disposed along a width direction of the outer wall and the side wall holes being separately arranged on a plane with a height ratio of the outer wall, wherein the height ratio is larger than 0 and smaller than 1; and
   a sealant, disposed in the sealant-disposing space between the inner wall and the outer wall.

2. The liquid crystal display panel as claimed in claim 1, wherein the sealant is further located in at least a part of the side wall holes.

3. The liquid crystal display panel as claimed in claim 1, wherein each of the side wall holes is disposed along a width direction of the outer wall and the side wall holes are separately arranged on a plane with substantially the same height of the outer wall.

4. The liquid crystal display panel as claimed in claim 3, wherein an internal sidewall of each side wall hole is adjacent to the first substrate.

5. The liquid crystal display panel as claimed in claim 4, wherein a height of each side wall hole is substantially a half height of the outer wall.

6. The liquid crystal display panel as claimed in claim 3, wherein the side wall holes are arranged on a plane with a half height of the outer wall.

7. The liquid crystal display panel as claimed in claim 6, wherein a height of each side wall hole is substantially a quarter height of the outer wall.

8. The liquid crystal display panel as claimed in claim 1, wherein the first substrate has a first common electrode and the second substrate has a second common electrode, the second common electrode extends onto the surface of the inner wall and the first common electrode and the second common electrode are electrically connected to each other via the inner wall.

9. The liquid crystal display panel as claimed in claim 8, wherein the surface of the inner wall has a deformation-buffering pattern thereon, and the first common electrode and the second common electrode are connected to each other through the deformation-buffering pattern of the inner wall.

10. The liquid crystal display panel as claimed in claim 1, further comprising a plurality of conductive spacers located between the first substrate and the second substrate, wherein a first common electrode on the first substrate and a second common electrode on the second substrate are electrically connected to each other via the conductive spacers.

11. The liquid crystal display panel as claimed in claim 10, wherein the conductive spacers are located in the displaying medium.

12. The liquid crystal display panel as claimed in claim 10, wherein the conductive spacers are located in the sealant-disposing space.

13. A sealing structure, configured to seal a displaying medium of a liquid crystal display panel between a first substrate and a second substrate, wherein the sealing structure comprises:
   an inner wall, surrounding the displaying medium;
   an outer wall, surrounding the inner wall so as to form a sealant-disposing space between the inner wall and the outer wall, wherein the outer wall has a plurality of side wall holes, each of the side wall holes being disposed along a width direction of the outer wall and the side wall holes being separately arranged on a plane with a height ratio of the outer wall, wherein the height ratio is larger than 0 and smaller than 1; and
   a sealant, filling into the sealant-disposing space between the inner wall and the outer wall.

14. The sealant panel as claimed in claim 13, wherein the sealant is further located in at least a part of the side wall holes.

15. The sealant panel as claimed in claim 13, wherein each of the side wall holes is disposed along a width direction of the outer wall and the side wall holes are separately arranged on a plane with substantially the same height of the outer wall.

16. The sealant panel as claimed in claim 15, wherein an internal sidewall of each side wall hole is adjacent to the first substrate.

17. The sealant panel as claimed in claim 16, wherein a height of each side wall hole is substantially a half height of the outer wall.

18. The sealant panel as claimed in claim 15, wherein the side wall holes are arranged on a plane with a half height of the outer wall.

19. The sealant panel as claimed in claim 18, wherein a height of each side wall hole is substantially a quarter height of the outer wall.

20. The sealant panel as claimed in claim 13, further comprising an electrode layer cladding the surface of the inner wall.

21. The sealant panel as claimed in claim 20, wherein a surface of the inner wall has a deformation-buffering pattern thereon.

22. A sealing structure, configured to seal a displaying medium of a liquid crystal display panel between a first substrate and a second substrate, wherein the sealing structure comprises:
   an inner wall, surrounding the displaying medium;
   an outer wall, surrounding the inner wall so as to form a sealant-disposing space between the inner wall and the outer wall, wherein the outer wall has a plurality of side wall holes, each of the side wall holes being disposed along a width direction of the outer wall and the side wall holes being separately arranged on a plane with a half height of the outer wall; and
   a sealant, filling into the sealant-disposing space between the inner wall and the outer wall.

* * * * *